(12) United States Patent
Lacaze

(10) Patent No.: US 7,466,574 B2
(45) Date of Patent: *Dec. 16, 2008

(54) METHOD FOR IMPROVING THE OPERATION OF A MATRIX CONVERTER

(75) Inventor: Alain Lacaze, Essert (FR)

(73) Assignee: Alstom Technology Ltd, Baden (CH)

( * ) Notice: Subject to any disclaimer, the term of this patent is extended or adjusted under 35 U.S.C. 154(b) by 454 days.

This patent is subject to a terminal disclaimer.

(21) Appl. No.: 11/091,999

(22) Filed: Mar. 29, 2005

(65) Prior Publication Data

US 2005/0248969 A1 Nov. 10, 2005

(30) Foreign Application Priority Data

Mar. 31, 2004 (DE) ............ 10 2004 016 453

(51) Int. Cl.
*H02M 5/00* (2006.01)
(52) U.S. Cl. ............ 363/148; 363/152
(58) Field of Classification Search ............ 363/148, 363/149, 150, 152, 153; 307/3; 318/800
See application file for complete search history.

(56) References Cited

U.S. PATENT DOCUMENTS

| 5,594,636 A | 1/1997 | Schauder ............ 363/160 |
| 6,519,170 B2 * | 2/2003 | Lacaze et al. ............ 363/152 |
| 6,711,038 B2 * | 3/2004 | Ziegler et al. ............ 363/123 |
| 7,084,524 B2 * | 8/2006 | Lacaze et al. ............ 307/3 |
| 2002/0093840 A1 | 7/2002 | Lacaze et al. ............ 363/152 |

FOREIGN PATENT DOCUMENTS

EP 1 199 794 4/2002

OTHER PUBLICATIONS

N. Mohan et al., "Power Electronics", 2$^{nd}$ Edition, John Wiley & Sons, New York, pp. 11-12, no date.

* cited by examiner

*Primary Examiner*—Jessica Han
(74) *Attorney, Agent, or Firm*—Darby & Darby

(57) ABSTRACT

A method for operating a matrix converter in which m phases of a generator generating alternating voltage with n phases of a load are alternatingly connected via a multiple number of controllable bi-directional switches arranged in an (m×n) matrix. An improvement of the spectrum of the generated alternating voltage, i.e. of the alternating voltage with n phases is achieved by means of voltages which are added on-line to the converter output or input.

20 Claims, 6 Drawing Sheets

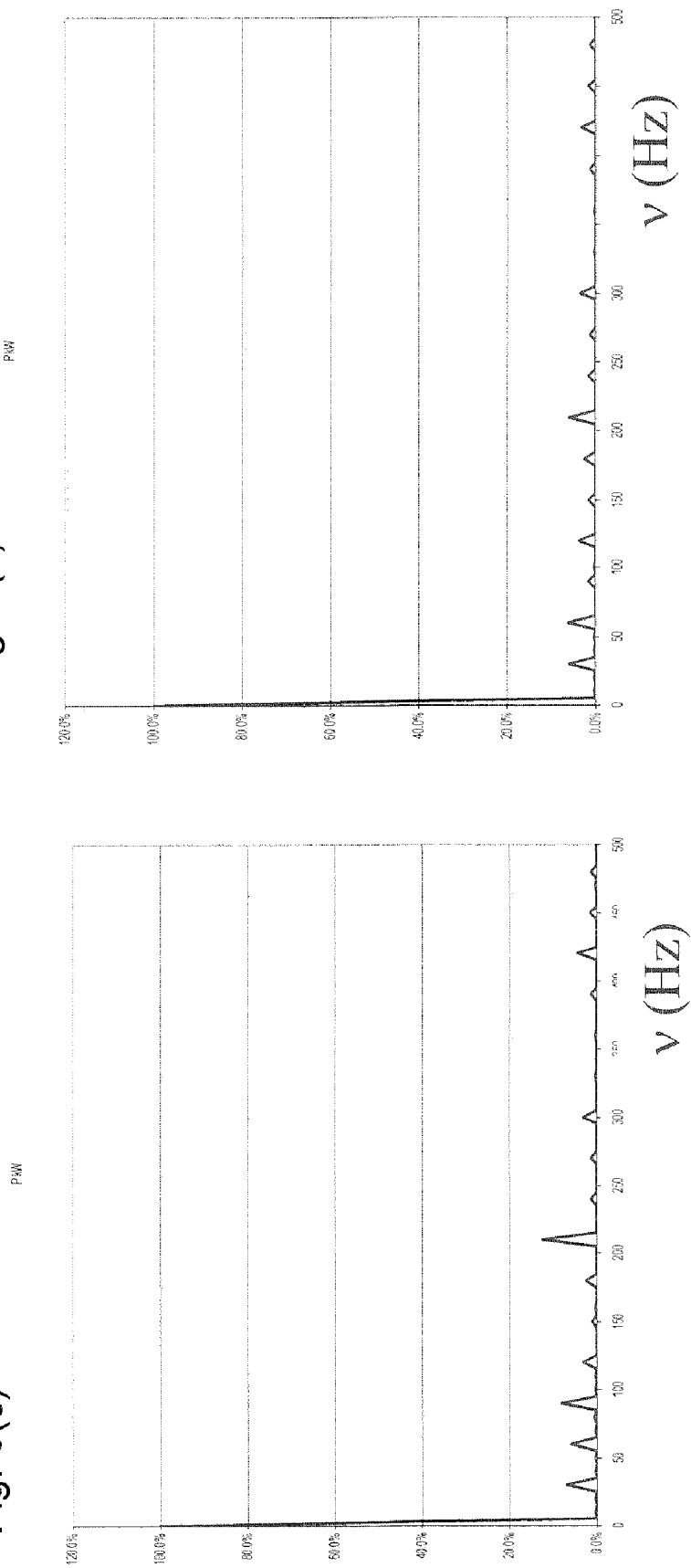

METHOD FOR IMPROVING THE OPERATION OF A MATRIX CONVERTER

Priority is claimed to German Patent Application No. DE 10 2004 016 453.3, filed on Mar. 31, 2004, the entire disclosure of which is incorporated by reference herein.

The present invention relates to the field of power electronics and in particular to power generation with a synchronous generator which is operated above the synchronous mains frequency, as well as the drive of variable-speed synchronous motors and induction motors.

The invention relates more specifically to a method for operating a matrix converter in which m phases of a generator generating alternating voltage with n (n<m) phases of a load are alternatingly connected via a multiple number of controllable bi-directional switches arranged in an (m×n) matrix. The invention also relates to a matrix converter for implementing the method.

BACKGROUND

In power generation, at a specified output, an increase of the rotary speed of a turbine is associated with a decrease in size and costs. Efficiency, too, can be improved. Already, power generation turbines up to 70 MW are connected to generators by way of gearing arrangements, so as to allow operation at higher rotary speeds. As the output increases, the use of gearing arrangements becomes increasingly difficult for safety reasons. In such cases, the turbine is operated at synchronous speed.

The use of a gearing arrangement is associated with a number of disadvantages, such as a fixed transmission ratio, a noise level above 100 dB for 40 MW, and above 115 dB for 70 MW, mechanical losses irrespective of the particular load, and exacting requirements with regard to cooling and lubrication with oil.

The use of static frequency converters (power electronics) represents an alternative. Among others, the following advantages could be expected: reduced costs of the generator in agreement with a constant product of volume and rotational speed, a standardised generator for both 50 and 60 Hz, an adjustable speed which allows restoration of the partial-load efficiency of the turbine, reduced losses in relation to the gearing arrangement (at least in partial load), no upper limit of the possible output, and use of the generator as a starter motor (in the case of gas turbine applications).

Both in the case of power generation and in the case of drives, a reduction in losses of the static frequency converters would bring about substantial cost savings. A reduction of the losses would above all have a bearing on investment costs because cooling accounts for a substantial part of the total costs of the converter.

Static frequency converters exist both with indirect AC/DC/AC conversion and with direct AC/AC conversion.

The indirect conversion (AC/DC/AC) is caused by generating a directed direct current or a directed direct voltage from the three-phase source (mains in the case of motors; generator in the case of power generation). Subsequently, the direct current or the direct voltage is converted back to an alternating current by means of an inverter.

An inductance (current converter) or a capacitor bank (voltage converter) are switched into the intermediate circuit so as to reduce the ripple component of the current or the spikes.

These days, converters make use of thyristors. If natural commutation of the thyristors is possible, the losses in the converter are reduced. However, induction motors for example, take up reactive power. In order to make this reactive power from the net available, it should be possible to switch off the current in a specified arm of the converter at any desired time. In this case there is forced commutation and thus there are increased losses.

Voltage converters use GTOs with their inherent high switching losses, as well as IGBTs or IGCTs. The power of the individual components is less than that of thyristors, consequently, a larger number of components are required for a specified voltage or a specified current.

Direct conversion (AC/AC) is for example possible by means of a so-called cyclo-converter. Direct conversion provides significant advantages from the point of view of the electrical machine, because the current is more or less a sine-shaped wave rather than chopped direct current. It reduces the losses which occur additionally within the electrical machine and it also prevents pulsating torques.

However, the use of cyclo-converters limits the achievable frequency range to 0-⅓ of the input frequency. Due to imbalanced operation, exceeding the ⅓ limit results in overdimensioning up to a factor of 3.

Another possibility of direct conversion is provided by a so-called matrix converter in which each phase of a multi-phase source (generator or mains) is connected or connectable with each phase of a multi-phase load (mains, passive load, motors, etc.) by a bi-directional switch (see e.g. N. Mohan et al., Power Electronics, 2nd Edition, John Wiley & Sons, New York pp 11-12). The switches consist of an adequate number of thyristors to withstand the differential voltage between the phases, and the phase currents, and to allow current reversal. They can be regarded as truly bi-directional components with the options of jointly using additional wiring such as snubbers or the power supplies for the drive pulses for the antiparallel components.

The switches are arranged in an (m×n)-matrix at m phases of the source and n phases of the load. This provides the option of establishing any desired connections between the input phases and the output phases; however at the same time it has the disadvantage in that certain switching states of the matrix must not be allowed since otherwise for example a short circuit would result. Furthermore it is desirable to carry out commutation from one phase to another phase such that the lowest possible switching losses result.

U.S. Pat. No. 5,594,636 describes a matrix converter and a process for its operation in which commutation between the phases is partly carried out as a natural commutation, with a forced commutation where natural commutation is not possible. Although with this type of selection, switching losses are reduced due to natural commutation, those switching losses which arise from forced commutation still remain. Furthermore, the possible forced commutation necessitates the use, in all positions on the matrix, of components which can be switched off. This considerably increases the switching expenditure.

EP-A-1 199 794 describes a matrix converter as well as a method for operating such a matrix converter wherein the essence of the disclosure consists of allowing commutation from one phase to another phase only if such commutation can be carried out as a natural commutation, and of stating a condition for it which can be expressed in a simple way in easily measurable quantities of the matrix converter, and can therefore be easily verified. It therefore takes benefit of a very low commutation frequency, combined with natural commutations, to drastically reduce the commutation loss power. The purpose of the proposed matrix converter is actually to improve the overall efficiency. However, a low commutation frequency usually results in a heavy harmonic distortion, which also holds true for the matrix converter as disclosed in EP-A-1 199 794.

SUMMARY OF THE INVENTION

An object of the present invention is to provide an improved method for operating a matrix converter and/or an improved matrix converter for implementing the method. In particular the frequency spectrum of the output of a matrix converter with low commutation frequency combined with natural commutations, which generally give rise to heavy harmonic distortion, shall be improved or cleared up.

According to the present invention voltages are added on-line to the converter output or input for the improvement of the spectrum of the generated alternating voltage.

The present invention provides a method for operating a matrix converter in which m phases of a generator generating alternating voltage with n (n<m) phases of a load are alternatingly connected via a multiple number of controllable bi-directional switches arranged in an (m×n) matrix, characterized in that for the improvement of the spectrum of the generated alternating voltage, voltages are added on-line to the converter output or input. The present invention also provides a conversion unit, such as a matrix converter, for converting m phases of a generator generating alternating voltage to n (n<m) phases of a load wherein the phases are alternatingly connected via a multiple number of controllable bi-directional switches arranged in an (m×n) matrix, characterised in that for the improvement of the spectrum of the generated alternating voltage, means are provided to add voltages on-line to the converter output or input, wherein preferably a method according to any of the preceding claims is used.

One feature of the invention is therefore the fact that the voltage spectrum can surprisingly easily be affected and corrected for harmonic distortions by adding a specific compensating spectrum of voltages to either the input of the matrix converter or to the output of the matrix converter. Since the compensation voltage can for example be provided by using the energy from the generator, the overall efficiency of the unit is not decreased by method. Correcting voltages can be added to the input or to the output of the matrix converter, but it is also possible to at the same time add correcting voltages to the input as well as to the output of the matrix converter.

In a first preferred embodiment of the present invention, the added voltages are determined based on the uninfluenced voltage spectrum, which can either be measured or calculated. Alternatively, iteratively improved added voltages may be stepwise optimised by measuring or calculating the present status, which may already include correcting addition of voltages, and by proposing an improved spectrum of voltages to be added either to the input or the output of the matrix converter. If the spectrum is calculated, the spectrum of the electromotive force is preferably derived from the instants when the switches are turned on or off.

According to a further preferred embodiment of the present invention, the voltage spectrum for the determination of the voltage to be added is a calculated simulated electromotive force (EMF) spectrum. This simulated electromotive force spectrum is calculated based on the connectivity of the phases, on the phase relationship between input and output, and on the instants when the commutations of the switches are initiated and when the commutations are effectively completed, which latter is preferably determined by monitoring the individual switches in the converter. Such calculation is carried out for at least one real period of repetition of the switching cycle such as to make sure that all frequency component are taken account of.

Surprisingly, it can be shown that the use of the electromotive force spectrum as simulated based on the effective switching times and switching moments (due to the delay between the initiation of the commutation and the effective switching off of the corresponding switch after its initiation) and the use of the corresponding compensation real voltage based on such electromotive force spectrum leads to a very efficient compensation of deleterious harmonic components. Interestingly, if such compensation is based on an actual measurement of the frequency spectrum generated by the converter and by adding a corresponding compensation real voltage based on this measured frequency spectrum, this can, in the presence of big inductances, not lead to a full compensation of the harmonic distortions. Generally using a measured output spectrum leaves about one third of the harmonic distortions still present in spite of compensation voltages based on this measured spectrum. The proposed use of the electromotive force spectrum is therefore enormously advantageous. The simulated electromotive force spectrum will only give a normalized value of the compensation necessary, but subsequent scaling for adapting to the real output situation can easily be effected.

According to a preferred embodiment of the present invention, each phase is corrected individually, i.e. the addition is effected on each of the m phases of the generator if the voltages are added on-line to the converter input, and the addition is effected on each of the n phases of the generated alternating voltage if the voltages are added on-line to the converter output.

Alternatively it is possible to correct voltages of different phases using one single device acting on all phases.

According to another preferred embodiment of the present invention, the addition of voltages is effected by means of at least one auxiliary transformer acting on at least one phase. This means that the added voltage is simply coupled into the phase by a transformer which is energised correspondingly. Thereby, each phase can be individually corrected by a corresponding auxiliary transformer or it is possible to use a multi-phase auxiliary transformer for correcting several phases concomitantly.

A particularly simple way of realising such an auxiliary transformer is to use an auxiliary winding of the output transformer to this end.

The energy for the voltages added on-line to the converter output or input can be provided in different ways, and can be controlled by a corresponding control unit. The energy may be provided via the output mains connected to an auxiliary converter, or via a DC source connected to an auxiliary inverter. Preferentially, the power source energises at least one auxiliary transformer acting on at least one of the phases, preferably the power source energises one auxiliary transformer for each phase (input and / or output).

A particularly efficient means of providing the energy for the compensating voltage coupled into the phases be it on the generator side or the load side of the matrix converter is to add the energy for the voltages on-line to the converter output or input via an auxiliary winding on the generator, which is preferably mounted on the main shaft and connected to an auxiliary converter. Preferentially, the power source energises at least one auxiliary transformer acting on at least one of the phases.

Due to the typical characteristics of the harmonic distortions of the frequency spectrum of the output of the matrix converter, is advisable to use an auxiliary winding on the generator which produces a double frequency with crossed phases. This quite ideally provides a compensating voltage which is very close to the one needed and which does not have to be modified or controlled substantially furthermore.

According to a particularly preferred embodiment of the present invention, n phases of the generator are always connected with the load while (m−n) phases of the generator are not connected with the load, wherein switching over from a selected connected phase of the generator to a selected non-connected phase of the generator only takes place if the condition $$I_k \cdot (V_k - V_l) \cdot K_{ijkl} < 0$$

is met, where $I_k$ and $V_k$ is the current and the voltage of the selected connected phase, $V_l$ is the voltage of the selected non-connected phase and in each instance $K_{ijkl}$ is a characteristic constant for the mutual inductance between the phases of the generator and the inductance of the load. Preferentially, this mode of operation is characterised in that the switching state of the switches, the connection state of the phases of the generator, and the signs of the currents in the phases of the generator, and the differential voltages between the phases of the generator, are monitored or measured. Furthermore this mode of operation is characterised in that at specified preferably periodic points in time switch-over occurs, and in that for switch-over one or several phases of the generator are selected, which phases of the generator according to the information gained from monitoring or from measuring, are not connected and fulfill the conditions. Preferably, antiparallel thyristors are used as bi-directional switches. Basically, the present method can be advantageously applied in the context of the use of a matrix converter according to EP-A-1 199 794. The disclosure of this document is explicitly included into the present specification as concerns the basic underlying method of operation of the matrix converter.

Additionally, the present invention relates to a conversion unit, such as a matrix converter, for converting m phases of a generator generating alternating voltage to n (n<m) phases of a load, wherein the phases are alternatingly connected via a multiple number of controllable bi-directional switches arranged in an (m×n) matrix. Such a matrix converter is characterised in that for the improvement of the spectrum of the generated alternating voltage, means are provided to add voltages on-line to the converter output or input. Preferably the matrix converter is designed such as to be able to implement a method as described above.

According to a preferred embodiment of the matrix converter, it is characterised in that the means are given by at least one auxiliary transformer acting on at least one phase, wherein preferentially each phase is individually corrected by a corresponding auxiliary transformer or wherein alternatively a multi-phase auxiliary transformer is correcting several phases concomitantly. It goes without saying that the present invention also relates to upgrading a matrix converter with corresponding means like for example transformers for adding a voltage spectrum to compensate distortions of the harmonic spectrum.

Further embodiments of the present invention are outlined in the dependent claims.

BRIEF DESCRIPTION OF THE DRAWINGS

In the accompanying drawings preferred embodiments of the invention are shown, in which:

FIGS. 3(a)-3(d) show a) the voltage (solid line) and current (dotted line) spectrum without compensation; b) the voltage (solid line) and current (dotted line) spectrum with full compensation at 160 hertz and part compensation at 40 hertz; c) power spectrum (solid line) without compensation; d) power spectrum (solid line) with compensation.

DETAILED DESCRIPTION OF THE PREFERRED EMBODIMENTS

Figures 1A, 1B:
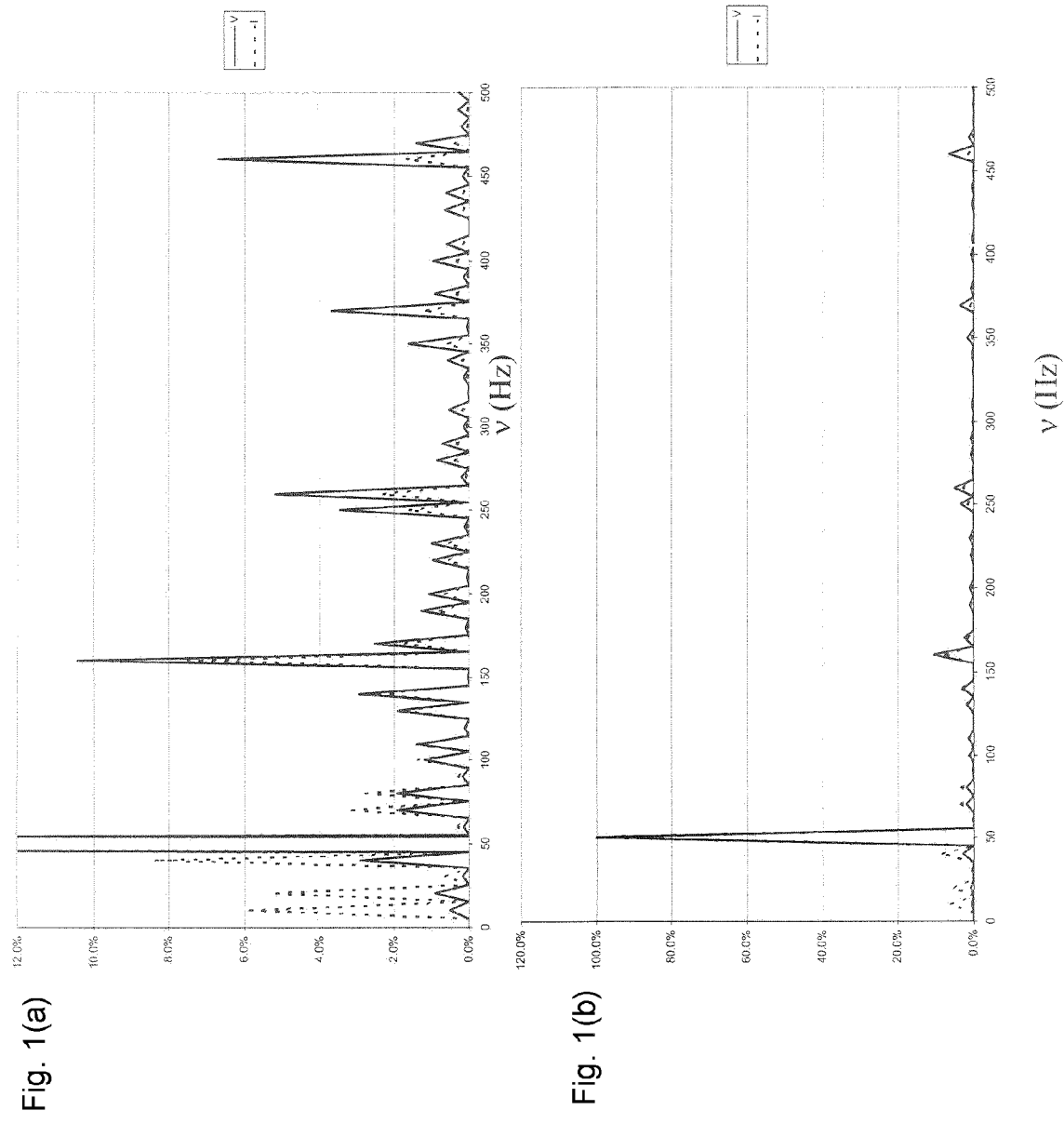
FIGS. 1(a)-1(c) display a) a spectrum of a matrix converter according to the state-of-the-art, wherein intensity of output voltage (solid line) and current (dotted line) are displayed as a function of the frequency (emphasised plot); b) same as a) but with full y-scale; c) power spectrum (solid line) of a matrix converter according to the state-of-the-art.
Figure 1C:
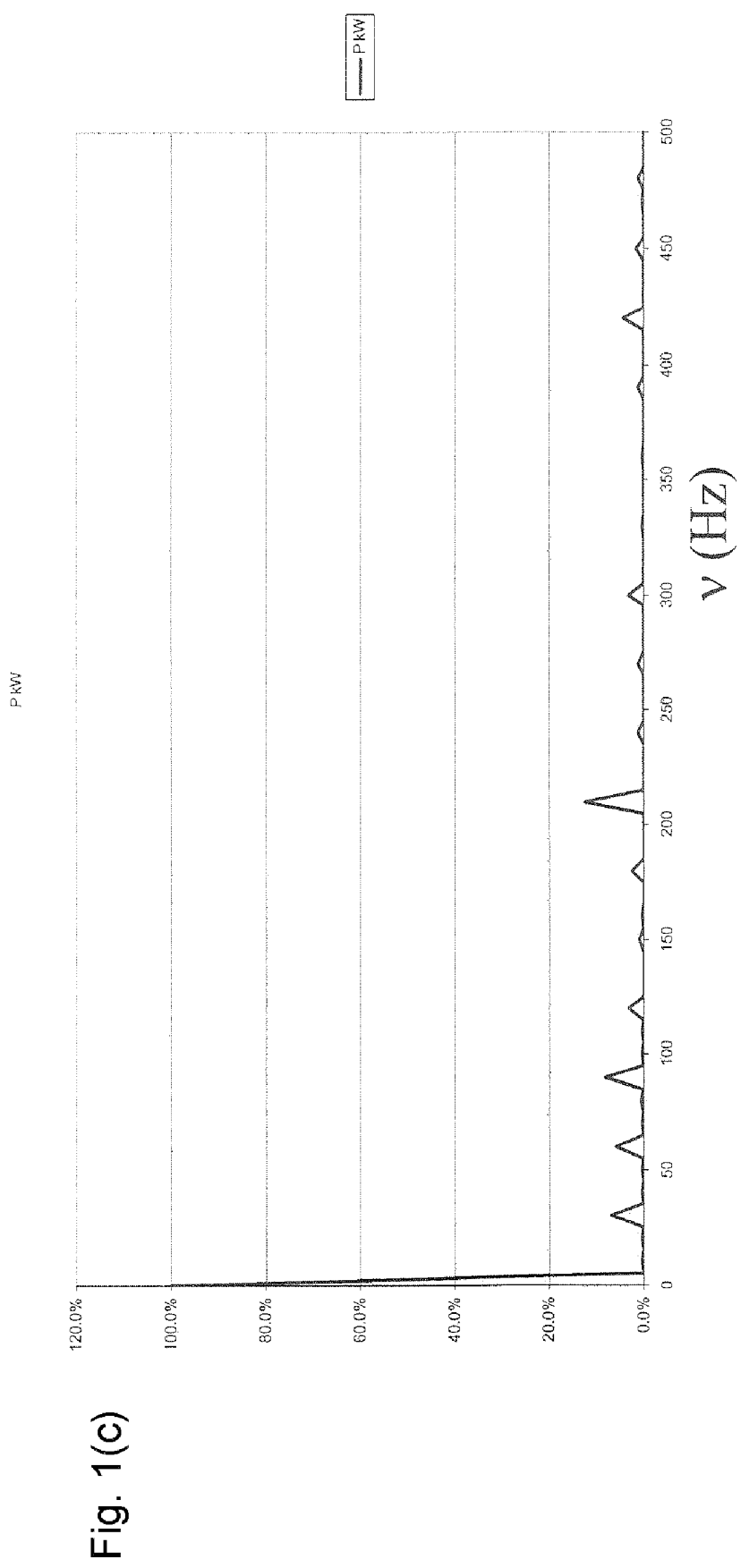

Referring to the drawings, which are for the purpose of illustrating the present preferred embodiments of the invention and not for the purpose of limiting the same, FIGS. 1(a)-1(c) show the output spectrum of a naturally commuted matrix converter as disclosed in EP-A-1 199 794. The essence of this disclosure consists of allowing commutation from one phase to another phase only if such commutation can be carried out as a natural commutation, and of stating a condition for it which can be expressed in a simple way in easily measurable quantities of the matrix converter, and can therefore be easily verified. The matrix converter is operated such that m phases of a generator generating alternating voltage with n (n<m) phases of a load are alternatingly connected via a multiple number of controllable bi-directional switches arranged in an (m×n) matrix, whereby n phases of the generator are always connected with the load while (m−n) phases of the generator are not connected with the load. EP-A-1 199 794 furthermore specifies that switching over from a selected connected phase of the generator to a selected non-connected phase of the generator only takes place if the condition $$I_k \cdot (V_k - V_l) \cdot K_{ijkl} < 0$$

is met, where $I_k$ and $V_k$ is the current and the voltage of the selected connected phase, $V_l$ is the voltage of the selected non-connected phase and in each instance $K_{ijkl}$ is a characteristic constant for the mutual inductance between the phases of the generator and the inductance of the load. The disclosure of EP-A-1 199 794 is explicitly included with respect to the present preferred embodiments, i.e. the method according to the present invention is applied to a matrix converter according to EP-A-1 199 794 and represent improvements of said matrix converter or its method of operation.

The matrix converter described in EP-A-1 199 794 takes benefit of a very low commutation frequency, combined with natural commutations, to drastically reduce the commutation loss power. The purpose is actually to improve the overall efficiency. A low commutation frequency however usually results in a heavy harmonic distortion. This can easily be seen from FIG. 1a), which shows an emphasised plot of the output spectrum according to FIG. 1b) of such a matrix converter. It can clearly be seen that not only there is substantial frequency components below operating frequency of the generator (50 Hertz), in particular at 20 and 40 Hertz, but also above, for example at 160 Hertz. The spectrum plot in FIG. 1a) shows frequencies which are not integer multiples of the fundamental output frequency (50 Hz). Sub-harmonics (lower than the fundamental at 50 Hz) are also visible. For instance the 10 and 20 Hz voltages are less than 1%, whereas 10 and 20 Hz currents are well in the 5% range. This will produce torque oscillations, and will result in a heavy thermal load on the rotor iron and rotor damper.

Figure 2:
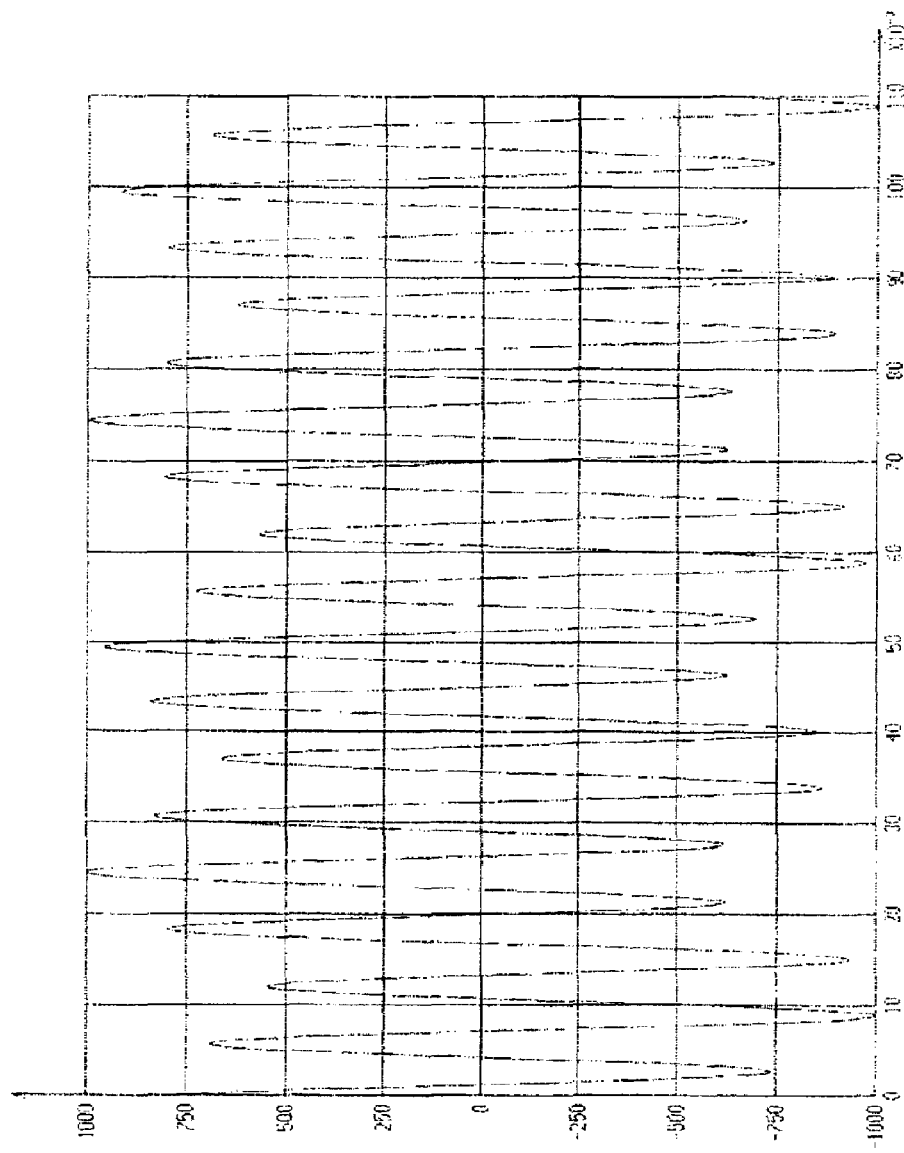
FIG. 2 displays a possible compensation voltage for compensating 10, 20, 40 and 160 hertz harmonics of the output of a matrix converter.

The plot in FIG. 2 shows the voltage which must be added to fully compensate the 10, 20, 40 and 160 Hz harmonics as visible in FIGS. 1(a)-1(c).

The compensation is selective. One can specify the harmonics to be compensated and the level of compensation. In a simplified way, this compensation voltage can be derived from the spectrum according to FIG. 1 by taking the negative of the spectrum of those frequency components which shall be eliminated and by generating the corresponding waveform.

Figure 3A:
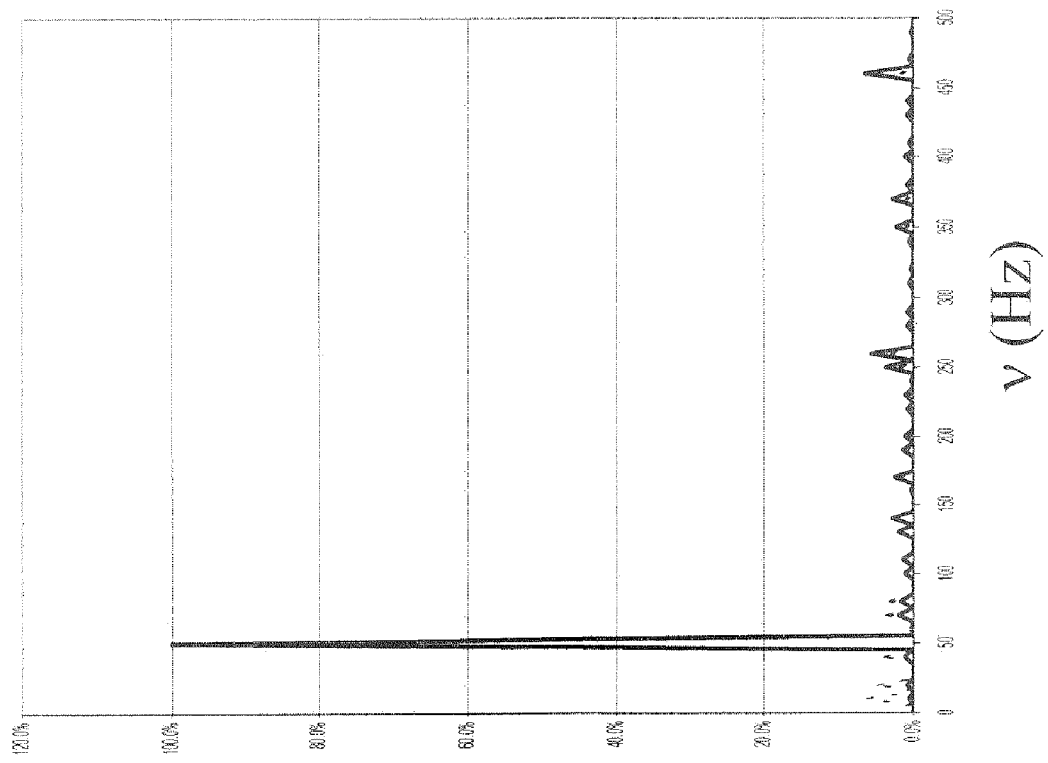
Figure 3B:
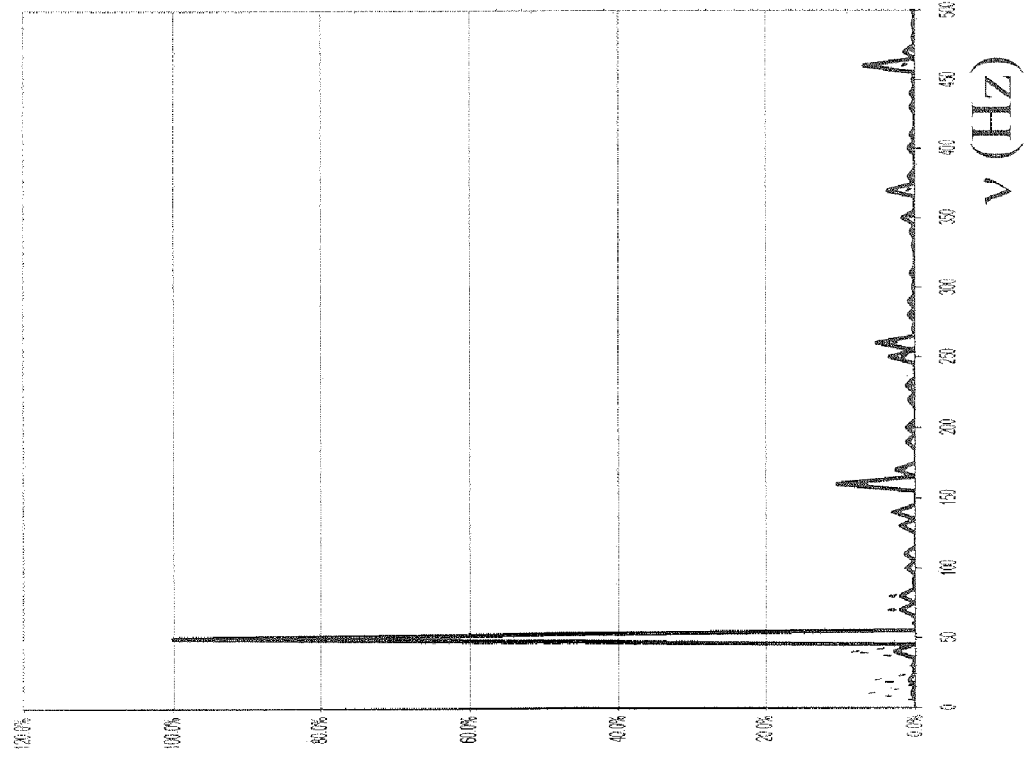

For instance the spectrum of FIG. 3b) shows voltage and current harmonics when the 160 Hz is fully cancelled (FIG. 3a shows the uncorrected spectrum) and the 40 Hz is partly cancelled. FIG. 3d) shows the impact on power spectrum (FIG. 3c shows the uncorrected spectrum). The power spectrum gives information on the harmonic distortion toward the input.

Figure 4:
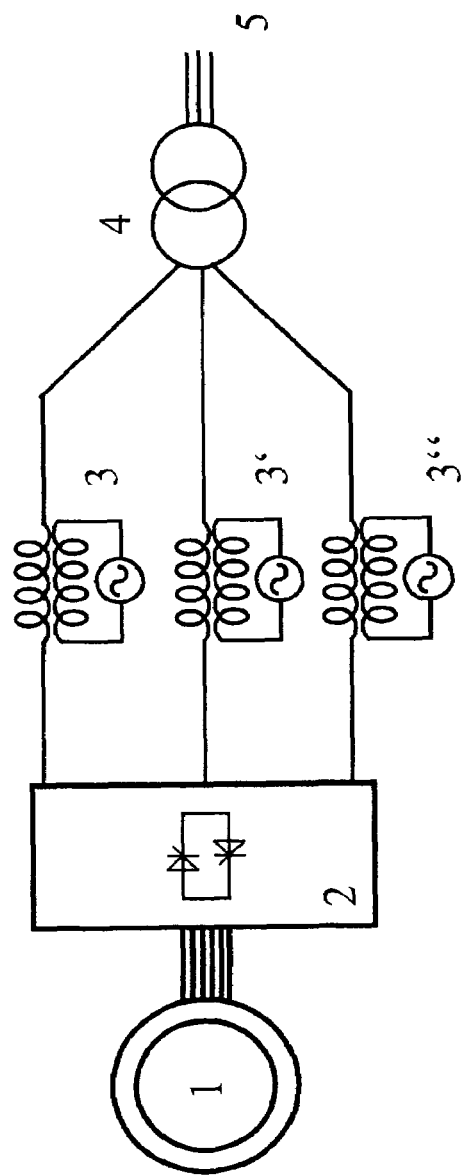
FIG. 4 displays a schematic drawing of a set-up allowing the application of compensation voltages.

As shown on the sketch of FIG. 4, in such a setup there is a generator 1, a matrix-converter 2 and for the connection to the load 5 (grid) there is provided a output transformer 4. The compensation voltages are preferably applied using single auxiliary transformers 3, 3' and 3" on each of the three output phases of the matrix converter 2 which is connected to the generator 1. The three auxiliary transformers 3, 3' and 3" preferably have a ratio of 1.

The auxiliary source to energise the auxiliary transformers 3, 3' and 3" should get the power from an auxiliary input and should be processed through an auxiliary converter. The auxiliary converter can be a matrix converter similar to the main converter.

Preferably the auxiliary power is generated from an auxiliary generator located on the main shaft of the machine, producing a double frequency, with crossed phases such that it already produces an output similar to a negative sequence as necessary for compensating the harmonic distortions of the matrix converter 2. The auxiliary generator, in this case, can be comparable in size and requirements to an exciter. For instance it will have a small gap.

Alternatively, the auxiliary transformer 3 can be a multiple phase transformer located on the outlet of the main converter, a set of single phase transformers or a multiple phase transformer located on the inlet of the main converter or an auxiliary winding of the output transformer.

The auxiliary power source for energising the auxiliary transformers 3 can be:

An additional winding on the generator
The output mains
A DC source, if combined with an inverter The benefit of using this architecture is that:

The involved power is substantially smaller than the main power flow, and it furthermore is mostly reactive.
The involved power can be produced with very high efficiency
Harmonic distortion is controlled through the effective electromotive force. The voltage and current harmonics are concurrently reduced.
The harmonic distortion toward the input is also compensated, see FIG. 3d).

To sum up, the following general points emerge:

1. Only the voltage spectrum is intended to be controlled. Current is expected to exhibit an improved spectrum because the electromotive forces which generate the harmonic currents are cancelled concomitantly.
2. The electromotive force spectrum is derived from the instants when switches are turned on or off.
3. A compensation voltage is generated from an auxiliary frequency converter and auxiliary source. The power involved is substantially lower than the main power.
4. The overall efficiency is kept high, all the components are used up to their ratings.

What is claimed is:

1. A method for operating a matrix converter having an input and an output, comprising:
generating alternating voltage with n phases of a load using a generator having m phases, wherein n<m;
alternatingly connecting the m phases of the generator using a plurality of controllable bi-directional switches arranged in an (m×n) matrix; and
adding voltages on-line to one of the input and the output so as to improve a voltage spectrum of the generated alternating voltage.

2. A method as recited in claim 1, further comprising determining the added voltages based on the voltage spectrum, the voltage spectrum being determined by one of measuring and calculating.

3. The method as recited in claim 2, wherein the voltage spectrum is calculated by deriving the voltage spectrum from instants when the plurality of controllable bi-directional switches are turned on or off.

4. The method as recited in claim 2, wherein determining the voltage spectrum includes calculating a simulated electromotive force (EMF) spectrum based on at least one of a connectivity of the phases, on a phase relationship between input and output, and on instants when commutations of the switches are initiated and when the commutations are effectively completed, and wherein the calculating is performed for at least one real period of repetition of a switching cycle.

5. The method as recited in claim 4, wherein the instants when the commutations of the switches are initiated and effectively completed are determined by monitoring the individual switches in the matrix converter.

6. The method as recited in claim 2, wherein the voltage spectrum is an uninfluenced voltage spectrum.

7. The method as recited in claim 1, wherein the adding of the voltages is performed on each of the m phases of the generator if the voltages are added on-line to the input of the matrix converter, and is performed on each of the n phases of the generated alternating voltage if the voltages are added on-line to the output of the matrix converter.

8. The method as recited in claim 1, wherein the adding of the voltages is performed using at least one auxiliary transformer acting on at least one phase.

9. The method as recited in claim 8, wherein the adding of the voltage is performed using at least one of multiple auxiliary transformers corresponding to each phase and correcting each phase individually and a multi-phase auxiliary transformer correcting several phases concomitantly.

10. The method as recited in claim 8, wherein the at least one auxiliary transformer is given by an auxiliary winding of an output transformer.

11. The method as recited in claim 1, further comprising providing energy for the adding of the voltages using a power source, the power source including one of the output mains connected to an auxiliary converter and a DC source connected to an auxiliary inverter.

12. The method as recited in claim 11, wherein the power source energises at least one auxiliary transformer acting on at least one of the phases.

13. The method as recited in claim 1, further comprising providing energy for the adding of the voltages using an auxiliary winding on the generator.

14. The method as recited in claim 13, wherein the auxiliary winding is mounted on a main shaft of the generator and connected to an auxiliary converter.

15. The method as recited in claim 14, wherein the auxiliary winding energises at least one auxiliary transformer acting on at least one of the phases.

16. The method as recited in claim 13, wherein the auxiliary winding produces a double frequency with crossed phases.

17. The method as recited in claim 1, wherein n phases of the generator are always connected with the load and (m−n) phases of the generator are not connected with the load, wherein a switching over from a selected connected phase of the generator to a selected non-connected phase of the generator only takes place if the condition $$I_k \cdot (V_k - V_l) \cdot K_{ijkl} < 0$$

is met, wherein $I_k$ and $V_k$ is the current and the voltage of the selected connected phase, $V_l$ is the voltage of the selected non-connected phase and in each instance $K_{ijkl}$ is a characteristic constant for a mutual inductance between the phases of the generator and an inductance of the load.

18. The method as recited in claim 17, further comprising at least one of monitoring and measuring a switching state of the switches, a connection state of the phases of the generator, signs of the currents in the phases of the generator, and differential voltages between the phases of the generator; performing a switch-over at specified points in time; and selecting one or more phases of the generator for the switch-over, wherein the one or more phases are selected using information from the at least one of monitoring and measuring, are not connected, and fulfill a predetermined condition.

19. The method as recited in claim 18, wherein the switch-over is performed at periodic points in time.

20. The method as recited in claim 17, wherein the bi-directional switches include antiparallel thyristors.

* * * * *